US012318785B2

(12) United States Patent
Pudduck

(10) Patent No.: US 12,318,785 B2
(45) Date of Patent: Jun. 3, 2025

(54) FITMENT DEVICES, REAGENT CARTRIDGES CONTAINING FITMENT DEVICES, AND METHODS OF MANUFACTURING AND OPERATING SAME

(71) Applicant: Siemens Healthcare Diagnostics Inc., Tarrytown, NY (US)

(72) Inventor: Christian Pudduck, Norfolk, MA (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 929 days.

(21) Appl. No.: 17/593,316

(22) PCT Filed: Mar. 12, 2020

(86) PCT No.: PCT/US2020/022315
§ 371 (c)(1),
(2) Date: Sep. 15, 2021

(87) PCT Pub. No.: WO2020/190629
PCT Pub. Date: Sep. 24, 2020

(65) Prior Publication Data
US 2022/0184624 A1 Jun. 16, 2022

Related U.S. Application Data

(60) Provisional application No. 62/821,623, filed on Mar. 21, 2019.

(51) Int. Cl.
*B01L 3/00* (2006.01)

(52) U.S. Cl.
CPC ......... *B01L 3/527* (2013.01); *B01L 2200/028* (2013.01); *B01L 2200/12* (2013.01);
(Continued)

(58) Field of Classification Search
CPC ......... B01L 2200/026; B01L 2200/028; B01L 2200/12; B01L 2200/16; B01L 2300/042;
(Continued)

(56) References Cited

U.S. PATENT DOCUMENTS 5,390,814 A 2/1995 Christine et al.
5,665,315 A 9/1997 Robert et al.
(Continued)

FOREIGN PATENT DOCUMENTS

EP 0255210 * 5/1987
EP 0414992 A1 3/1991
(Continued)

OTHER PUBLICATIONS

Valdamark https://valdamarkdirect.com/blogs/heat-sealer-faqs/can-you-heat-seal-polypropylene#:~: text=Yes%2C%20you%20can%20heat%20seal, maintain%20a%20high%20enough%20temperature. (Year: 2024).*
(Continued)

*Primary Examiner* — Jennifer Wecker
*Assistant Examiner* — Jonathan Bortoli

(57) ABSTRACT

A fitment device may include a core formed from a first material having a first low permeability of oxygen. The core may include a securing portion configured to secure to a chassis, and a container portion including at least one side portion at least partially coated with a second material configured to seal to a container, wherein the first material is different than the second material and includes a different gas permeability of oxygen. An aperture may extend between the securing portion and the container portion. Reagent cartridges and methods of manufacturing and using fitment devices are also disclosed.

19 Claims, 8 Drawing Sheets

(52) U.S. Cl.
CPC ..... *B01L 2200/16* (2013.01); *B01L 2300/042* (2013.01); *B01L 2300/044* (2013.01); *B01L 2300/0672* (2013.01); *B01L 2300/123* (2013.01)

(58) Field of Classification Search
CPC ....... B01L 2300/044; B01L 2300/0672; B01L 2300/123; B01L 3/505; B01L 3/527; B65D 51/002; B65D 75/5883
See application file for complete search history.

(56) References Cited

U.S. PATENT DOCUMENTS

| | | | |
|---|---|---|---|
| 5,882,602 | A | 3/1999 | Savage et al. |
| 5,913,232 | A | 6/1999 | Betts et al. |
| 5,918,777 | A | 7/1999 | Flak |
| 8,191,735 | B2 | 6/2012 | Laible |
| 8,276,793 | B2 | 10/2012 | Dicks et al. |
| 2002/0066712 | A1 | 6/2002 | Brockwell |
| 2002/0166394 | A1 | 11/2002 | Mathur et al. |
| 2003/0047467 | A1* | 3/2003 | Smith .................. B29C 66/242 156/308.4 |
| 2004/0076546 | A1 | 4/2004 | Bissett |
| 2005/0150917 | A1* | 7/2005 | Dicks ................ B29C 66/72341 222/566 |
| 2007/0272710 | A1 | 11/2007 | Bui |
| 2010/0213215 | A1* | 8/2010 | Laible ...................... B67D 7/36 222/518 |
| 2015/0125574 | A1* | 5/2015 | Arent ................... B65D 75/525 426/106 |
| 2015/0210458 | A1 | 7/2015 | Ziegenfelder et al. |
| 2015/0355207 | A1 | 12/2015 | Pollack et al. |
| 2015/0361488 | A1 | 12/2015 | Schultz et al. |
| 2016/0184826 | A1 | 6/2016 | Nemoto et al. |
| 2016/0242674 | A1 | 8/2016 | Ahmad et al. |
| 2017/0266664 | A1 | 9/2017 | Lukhaub et al. |
| 2018/0043363 | A1 | 2/2018 | Blankenstein et al. |
| 2018/0290141 | A1 | 10/2018 | Knight |
| 2019/0344258 | A1 | 11/2019 | Motadel et al. |

FOREIGN PATENT DOCUMENTS

| | | | |
|---|---|---|---|
| EP | 1396439 | A1 | 3/2004 |
| JP | S63170035 | A | 7/1988 |
| JP | H0288664 | A | 3/1990 |
| JP | H10185776 | A | 7/1998 |
| JP | H11133032 | A | 5/1999 |
| JP | 2001509047 | A | 7/2001 |
| JP | 2008094454 | A | 4/2008 |
| JP | 2012021861 | A | 2/2012 |
| JP | 2017181033 | A | 10/2017 |
| WO | 9744662 | A1 | 11/1997 |
| WO | 0063080 | A2 | 10/2000 |
| WO | 2018184902 | A1 | 10/2018 |

OTHER PUBLICATIONS

Ineos Barex 210 E Acrylonitrile-Methyl Acrylate Copolymer. https://www.matweb.com/search/DataSheet.aspx?MatGUID=642060cb11204fcb95164a82edc4b5fa (Year: 2024).*

International Search Report and Written Opinion of International Application No. PCT/US2020/022315 dated Jun. 12, 2020.

Keller et al., "Water Vapor Premeation in Plastics", USDOE, Dept. of Homeland Security (DHS) (United States), Jan. 1, 2017, Revision 1, pp. 1-37.

* cited by examiner

FITMENT DEVICES, REAGENT CARTRIDGES CONTAINING FITMENT DEVICES, AND METHODS OF MANUFACTURING AND OPERATING SAME

This application claims priority to U.S. Provisional Application No. 62/821,623, filed Mar. 21, 2019, the disclosure of which is incorporated herein by reference in its entirety.

FIELD

The present application relates to reagent cartridges for gas analyzers and more particularly to fitment devices of reagent cartridges, and manufacturing methods thereof.

BACKGROUND

Gas analyzers, such as blood gas analyzers, undergo frequent calibration. Calibrated reagents are supplied to the gas analyzers and are analyzed to calibrate the gas analyzers. In order to provide accurate calibration, the calibration reagents should be pure. For example, the calibration reagents should not be contaminated by external gases.

Accordingly, improved reagent pouches and gas analyzer calibration methods are sought.

SUMMARY

In some embodiments, fitment devices are provided. The fitment devices may include: a core formed from a first material having a first permeability of oxygen less than 9.5 ($cm^3$) (mil)/(24 hrs) (100 $in^2$) (ATM) at 25° C., the core may include: a securing portion configured to secure to a chassis and a container portion including at least one side portion at least partially coated with a second material configured to seal to a container, wherein the first material is different than the second material; and an aperture extending between the securing portion and the container portion.

In other embodiments, reagent cartridges are provided. The reagent cartridges may include: at least one pouch configured to hold a reagent, the at least one pouch further comprising: a fitment device including a core formed from a first material, the core including a securing portion configured to secure to a chassis, a container portion including at least one side portion at least partially coated with a second material configured to seal to a container, wherein the first material is different than the second material, an aperture extending between the securing portion and the container portion; and a cover covering the aperture; and at least one piercing probe configured to puncture the cover.

In method embodiments, methods of operating a reagent cartridge having a cartridge chassis are provided. The methods may include: providing at least one pouch configured to hold a reagent, the at least one pouch comprising: a container; a fitment device including: a core formed from a first material, the core including a securing portion configured to secure to the cartridge chassis, a container portion including at least one side portion at least partially coated with a second material, wherein the first material is different than the second material, and the container portion is sealed to the container, an aperture extending between the securing portion and the container, and a cover closing off the aperture; and moving a piercing probe through the cover.

In some embodiments, methods of manufacturing a fitment device are provided. The methods may include forming a core from a first material having a first gas permeability, the core comprising: a securing portion configured to secure to a cartridge chassis, a container portion configured to seal to a container, and an aperture though the core between the securing portion and the container portion; and coating at least a portion of the container portion and at least a portion of the aperture with a second material having a second gas permeability, wherein the second gas permeability is greater than the first gas permeability.

Numerous other aspects and features are provided in accordance with these and other embodiments of the disclosure. Other features and aspects of embodiments of the disclosure will become more fully apparent from the following detailed description, the claims, and the accompanying drawings.

BRIEF DESCRIPTION OF DRAWINGS

The drawings, described below, are for illustrative purposes only and are not necessarily drawn to scale. The drawings are not intended to limit the scope of the disclosure in any way. Wherever possible, the same or like reference numbers will be used throughout the drawings to refer to the same or like parts.

4B illustrates an isometric view of a fitment device at least partially coated with a second material, the fitment device used in a reagent pouch according to embodiments disclosed herein.

Figure 5A:
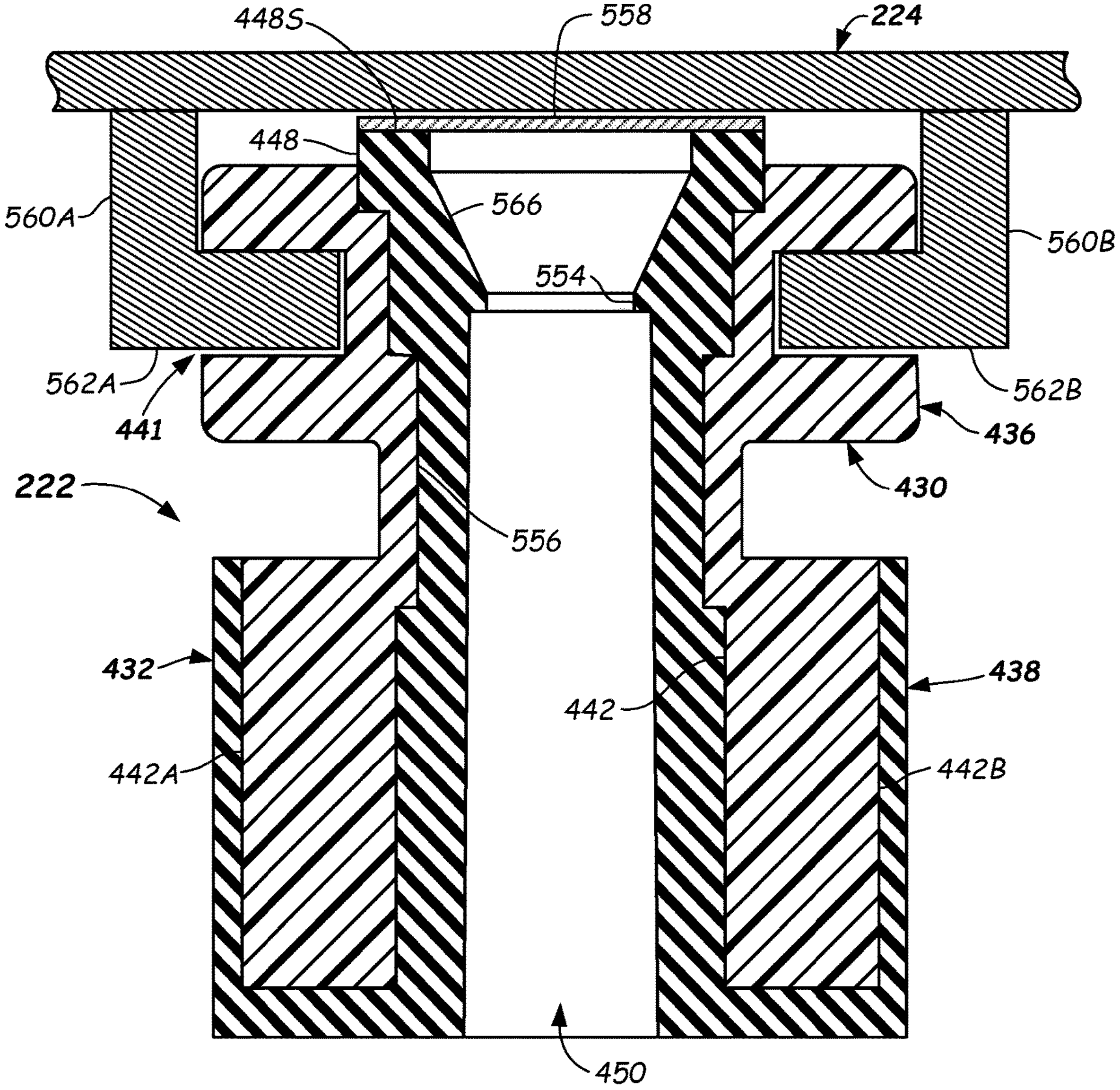

FIG. 5A illustrates a cross-sectioned side view of a fitment device including a bore, wherein the bore is devoid of a probe according to embodiments disclosed herein.

Figure 5B:
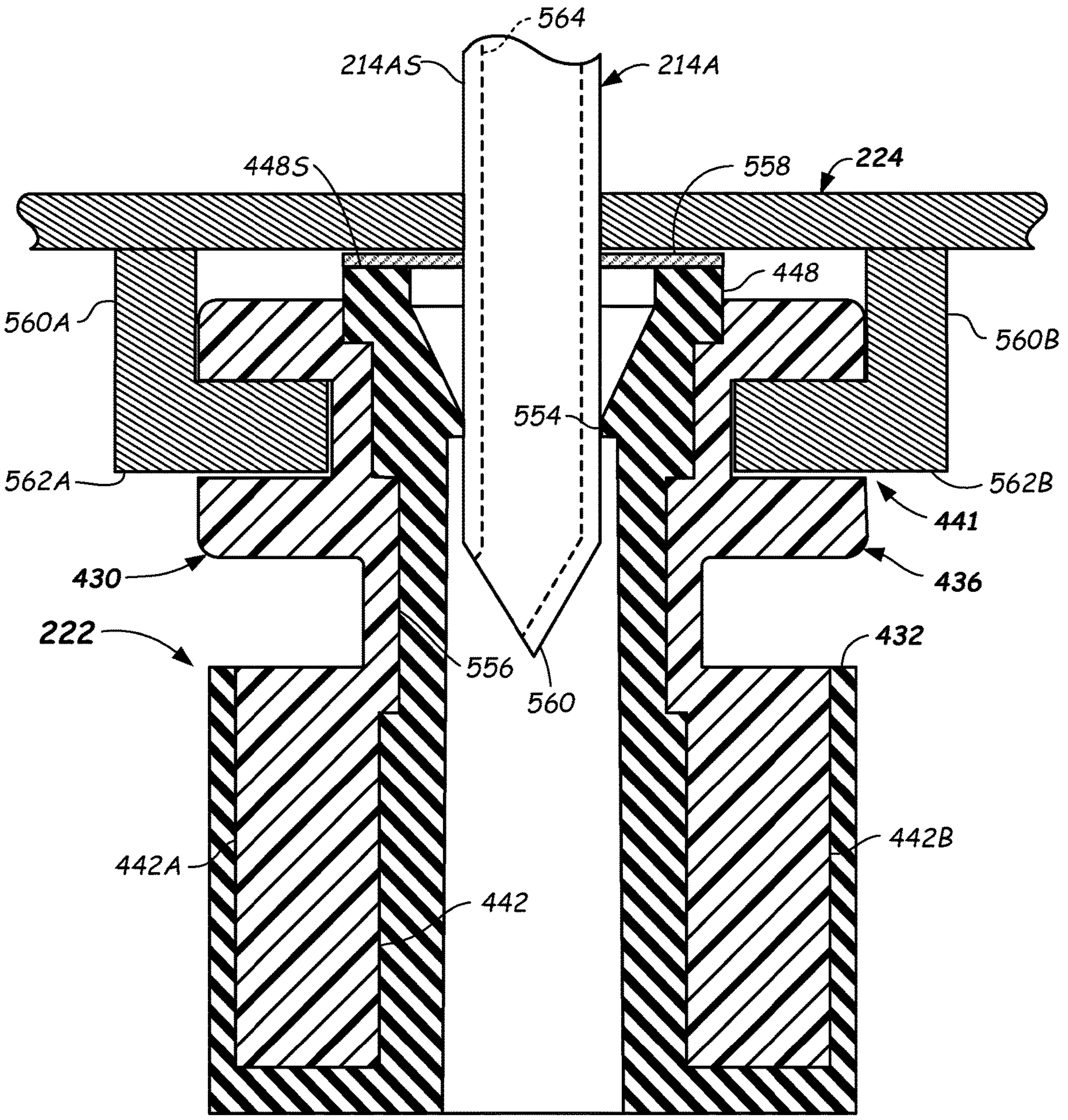

FIG. 5B illustrates a cross-sectioned view of a fitment device including a bore, wherein a probe is received in the bore according to embodiments disclosed herein.

Figure 6:
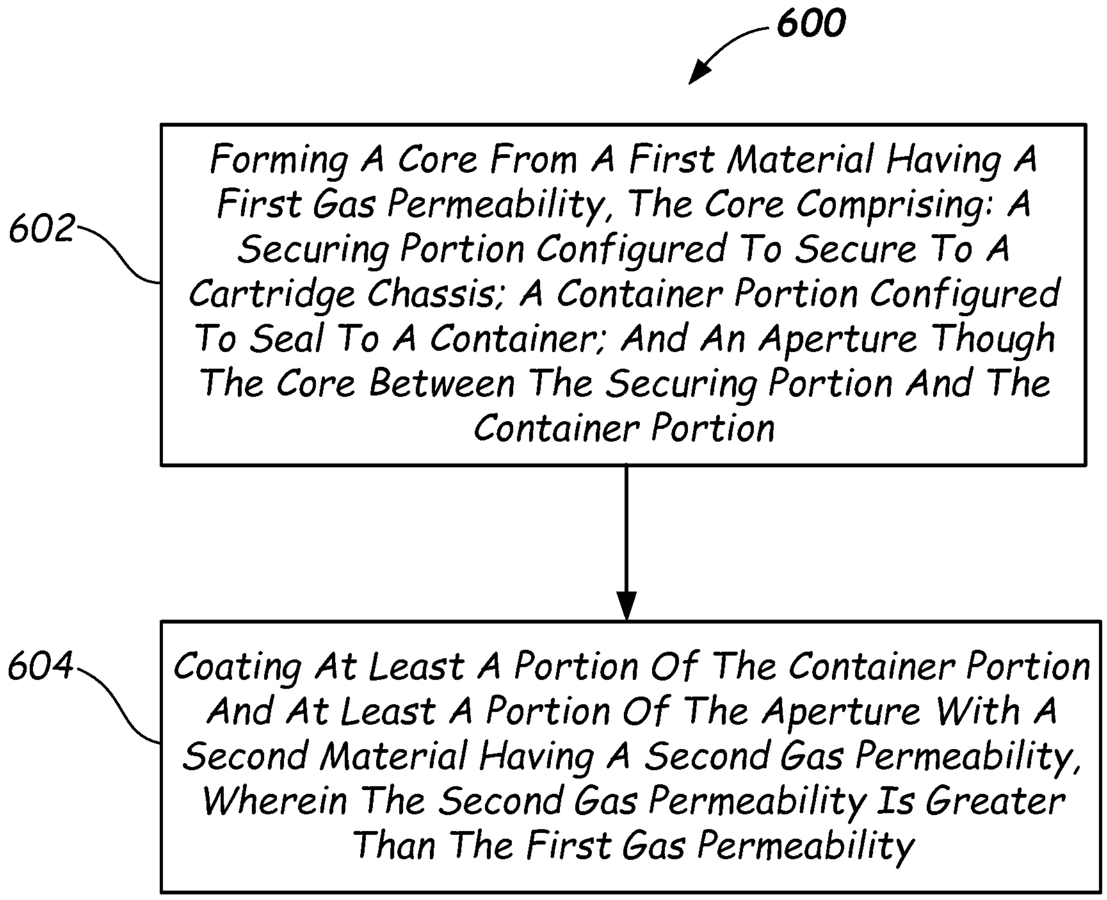

FIG. 6 illustrates a flowchart of a method of manufacturing a fitment device according to embodiments disclosed herein.

DETAILED DESCRIPTION

Reference will now be made in detail to the example embodiments provided, which are illustrated in the accompanying drawings. Features of the various embodiments described herein may be combined with each other unless specifically noted otherwise.

Gas analyzers, such as blood gas analyzers, undergo frequent calibration in order to provide accurate analysis. Pouches filled with certain calibration reagents may be supplied to the gas analyzers. The calibration reagents include known and precise chemical compositions that are analyzed by the gas analyzers as part of the calibration process. The results of the analysis of the calibration reagents are used by the gas analyzers for calibration.

The pouches may each include a container that is configured to store a calibration reagent. Fitment devices attached to the pouches enable the gas analyzer to access the calibration reagents, and the fitment devices can be also used to secure the pouches within the gas analyzers. Conventional fitment devices may have gas permeability that is high enough to allow some gas to permeate into the containers, which can degrade the calibration reagents. The degraded calibration reagents can, in some cases, cause inaccurate calibration and thus inaccurate gas analysis.

Pouches, containers, fitment devices, and other apparatus having low gas permeability are disclosed herein and are described with reference to FIGS. 1A-6. The pouches may include fitment devices that secure the pouches to the reagent cartridges and enable access to reagents (e.g., calibration reagents) stored in the containers. A fitment device may include a securing portion that secures the pouch to a chassis or the like within a reagent cartridge. The fitment device may also include a container portion that is configured to seal the fitment device to the container. An aperture may extend between the securing portion and the container portion and may be configured to receive a probe that extends into the container for enabling access to the reagent contained therein.

In accordance with one or more embodiments of the disclosure, the fitment device may include a core made from a first material, such as nylon, that has low gas (e.g., oxygen) permeability. A second material may coat at least one portion of the core and may enable the container to be sealed to the core. For example, the second material may enable a seam of the container to be sealed to the container portion of the fitment device. The second material may extend into an aperture to form a bore, wherein a probe may be receivable in the bore. The second material may at least partially form a seal with the probe. The configuration of the fitment device reduces the gas permeability of the pouch, which aids in preserving the reagent located therein, i.e., reduces gas (e.g., oxygen) contamination thereof. The fitment devices and other apparatus and methods disclosed herein may be used in other devices.

Figure 1A:
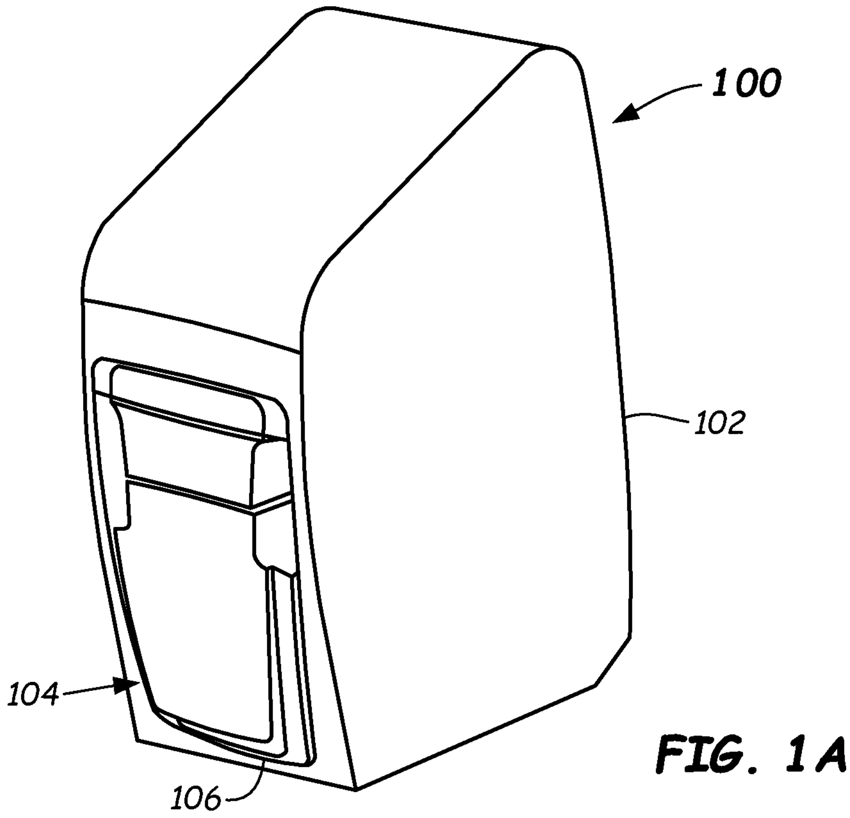
FIG. 1A illustrates a side isometric view of a gas analyzer in a closed state according to embodiments disclosed herein.
Figure 1B:
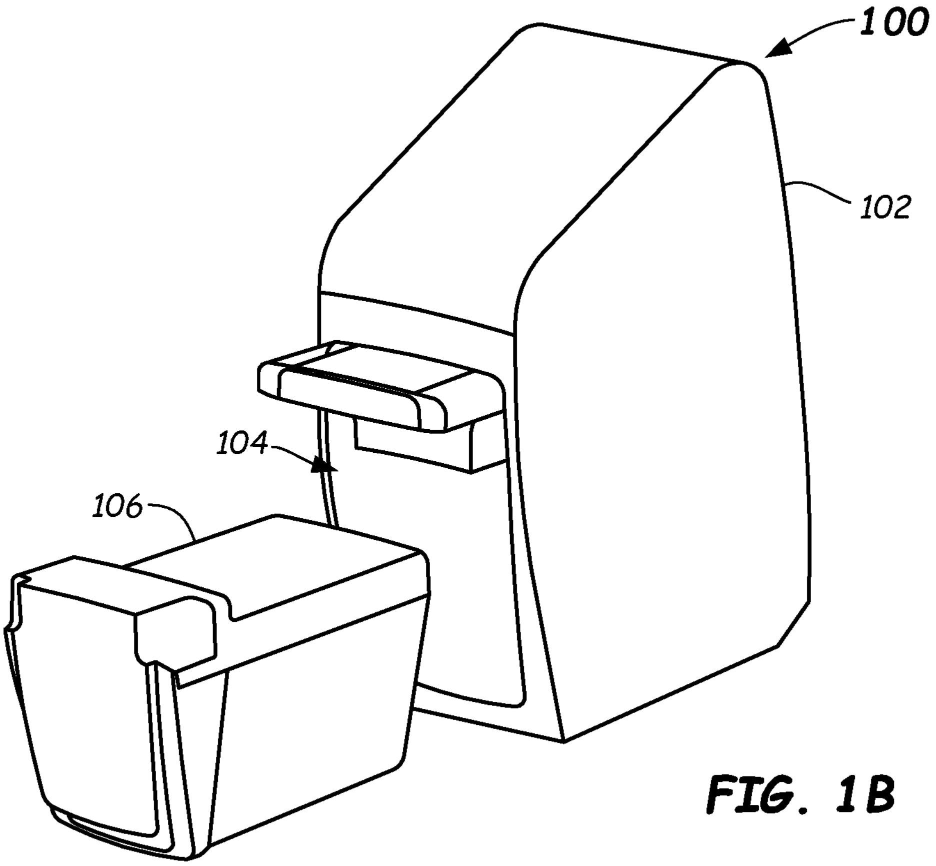
FIG. 1B illustrates a side isometric view of a gas analyzer in an open state and receiving a reagent cartridge according to embodiments disclosed herein.

Reference is now made to FIG. 1A, which illustrates a side isometric view of a gas analyzer 100 (e.g., a blood gas analyzer) shown in a closed state. Reference is also made to FIG. 1B, which illustrates the gas analyzer 100 in an open state. The gas analyzer 100 may, in some embodiments, analyze liquid (e.g., blood) samples and may measure the concentration levels of one or more chemicals or analytes in the samples. The gas analyzer 100 may include a body 102 including an opening 104, wherein a removable reagent cartridge 106 may be receivable in the opening 104. FIG. 1A illustrates the gas analyzer 100 in the closed state wherein the reagent cartridge 106 has been received within the opening 104. FIG. 1B illustrates the gas analyzer 100 in the open state wherein the reagent cartridge 106 is receivable in or removed from the opening 104.

The reagent cartridge 106 may include a plurality of calibration reagents (e.g., liquid calibration reagents) stored in a plurality of pouches (not shown in FIG. 1A or 1B). The calibration reagents may be stored in individual containers and may contain precise levels of dissolved gases used by the gas analyzer 100 for calibration. For example, the gas analyzer 100 may analyze the calibration reagents and determine that specific chemicals (e.g., gases) are present in the calibration reagents. The gas analyzer 100 may then be calibrated based on the differences between the analysis and the specific chemicals of known concentrations that are known to be in the calibration reagents.

Figure 2A:
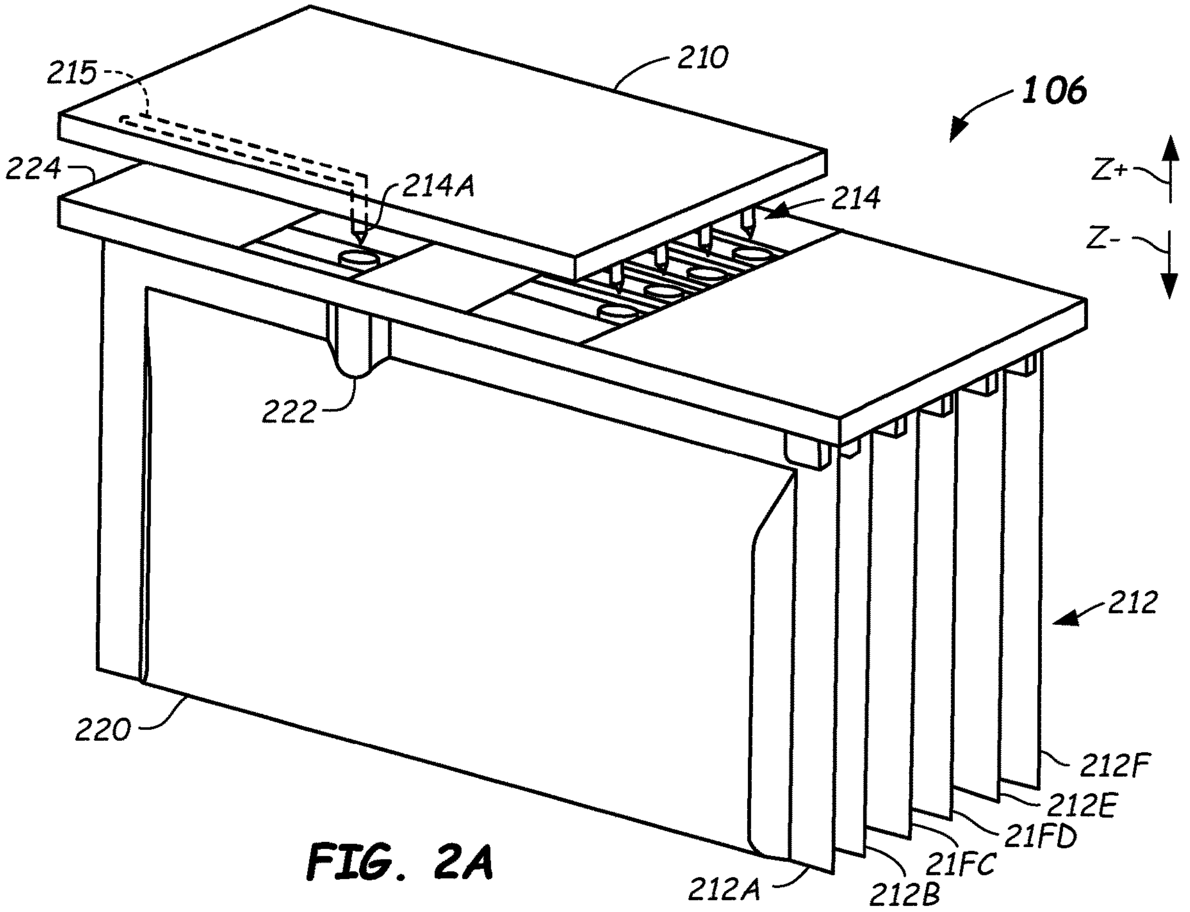
FIG. 2A illustrates an interior of a reagent cartridge used in a gas analyzer according to embodiments disclosed herein.
Figure 2B:
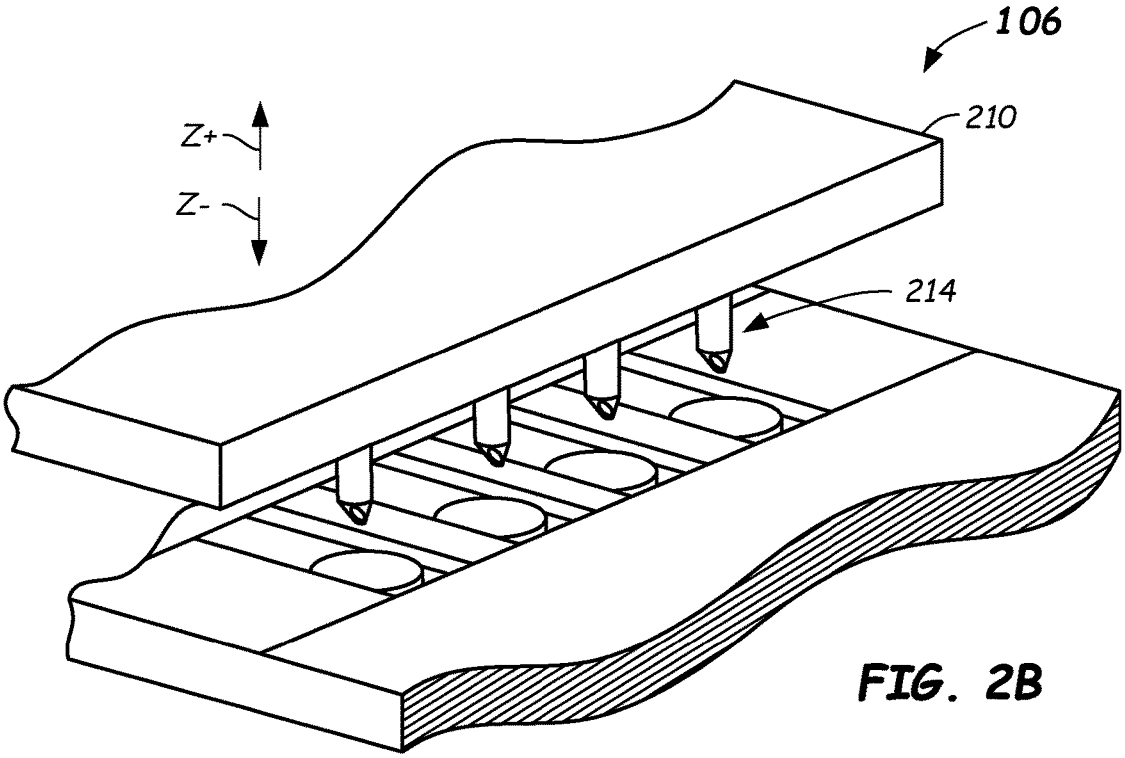
FIG. 2B illustrates an enlarged view of a manifold and other components within a reagent cartridge according to embodiments disclosed herein.

Reference is now made to FIG. 2A, which illustrates an example of the interior of the reagent cartridge 106. Reference is also made to FIG. 2B, which illustrates an enlarged view of a manifold 210 and other components within the reagent cartridge 106. The reagent cartridge 106 may include a plurality of pouches 212 (e.g., reagent pouches) that store the calibration reagents. The embodiment of the reagent cartridge 106 illustrated in FIG. 2A shows six pouches 212 referred to individually as pouches 212A-212F. A plurality of probes 214 (e.g., piercing probes) may be coupled to the manifold 210 so as to pierce and be inserted into the pouches 212A-212F as the manifold 210 moves in a −Z direction toward the pouches 212. In the embodiments illustrated in FIGS. 2A and 2B, the manifold 210 is in a first position wherein the probes 214 are in a first position spaced from the pouches 212. The manifold 210 may move to a second position wherein the probes 214 pierce a seal and are located in the pouches 212.

Reference is made to the pouch 212A, which may be identical or substantially similar to all the pouches 212. The pouch 212A may include a container 220 that stores the calibration reagent (not shown). A fitment device 222 may be sealed to the container 220. The fitment device 222 may secure the pouch 212A to a cartridge chassis 224 within the reagent cartridge 106 as described in greater detail below. A probe 214A (e.g., a piercing probe) may be received within the fitment device 222 to access the calibration reagent stored in the container 220. For example, the manifold 210 may move from the first position to the second position, which may move the probe 214A into the fitment device 222.

Figure 3:
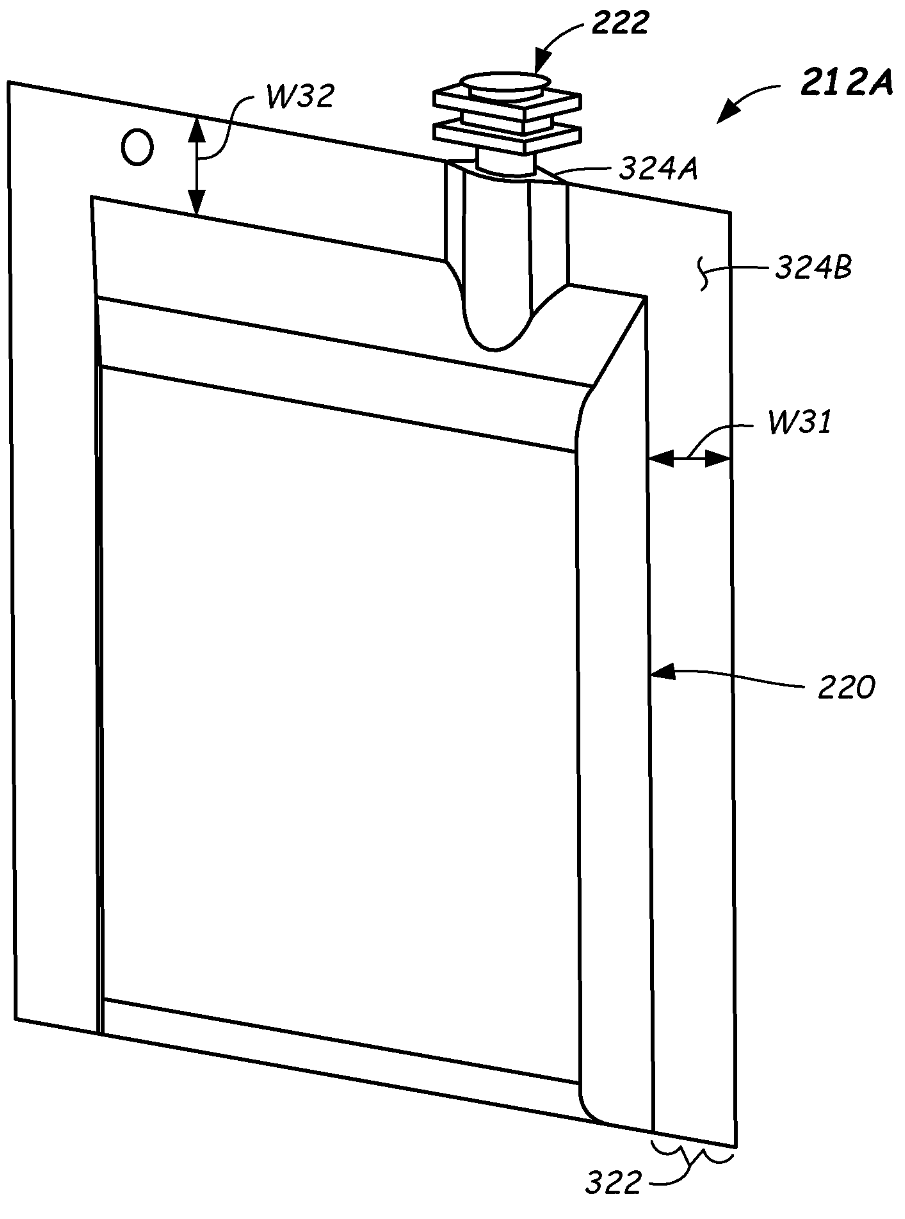
FIG. 3 illustrates a front isometric view of a pouch used in a calibration cartridge according to embodiments disclosed herein.

Additional reference is made to FIG. 3, which illustrates a front isometric view of the pouch 212A removed from the reagent cartridge 106 (FIG. 2A). The rear view is substantially the same as the front view. The container 220 may include a seam 322 extending around a least a portion of the periphery of the container 220. The seam 322 forms a seal that prevents the calibration reagent from leaking from the container 220. The seam 322 may also prevent gases from entering and/or exiting the container 220, which could contaminate the calibration reagent. The seam 322 may have a width W31 on the sides of the container 220 and a width W32 on a top of the container 220 proximate the fitment device 222 (shown sealed to the container 220). The container 220 may be formed from a first container material 324A and a second container material 324B that are adhered together at the seam 322. For example, the first container material 324A and the second container material 324B may be heat-sealed together. The first container material 324A and the second container material 324B may include a foil layer (not shown) that has low gas permeability. For example, the foil layer may have a gas permeability of oxygen less than 1.2 ($cm^3$) (mil)/(24 hrs) (100 $in^2$) (ATM) at 25° C. In some embodiments, the container 220 may be formed from a single piece of material that is folded and sealed at the seam 322.

As described above, pouch 212A includes the fitment device 222 that enables the probe 214A (FIG. 2A) to access the container 220. The fitment device 222 may also secure the pouch 212A to the cartridge chassis 224 within the reagent cartridge 106 (FIG. 2A). In the embodiment of FIG. 3, portions of the first container material 324A and the second container material 324B may be sealed to sides of the fitment device 222 so as to seal the container 220 to the fitment device 222. For example, the sealing of the first container material 324A and the second container material 324B to the fitment device 222 may prevent the exchange of gases between the ambient environment and the interior of the container 220 around the fitment device 222.

Figure 4A:
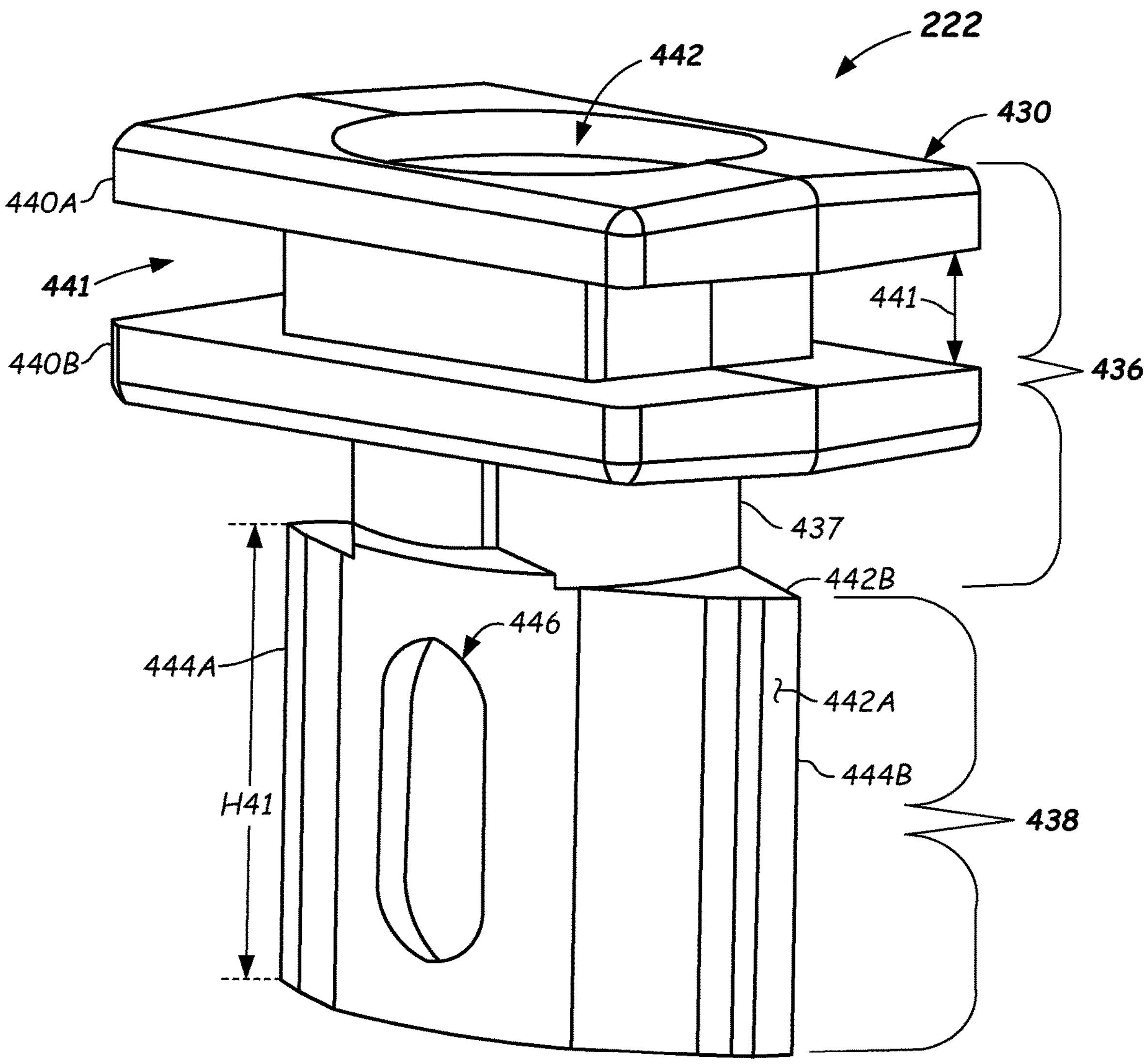
FIG. 4A illustrates an isometric view of a fitment device used in a reagent pouch, wherein the fitment device is devoid of a second material according to embodiments disclosed herein.
Figure 4B:
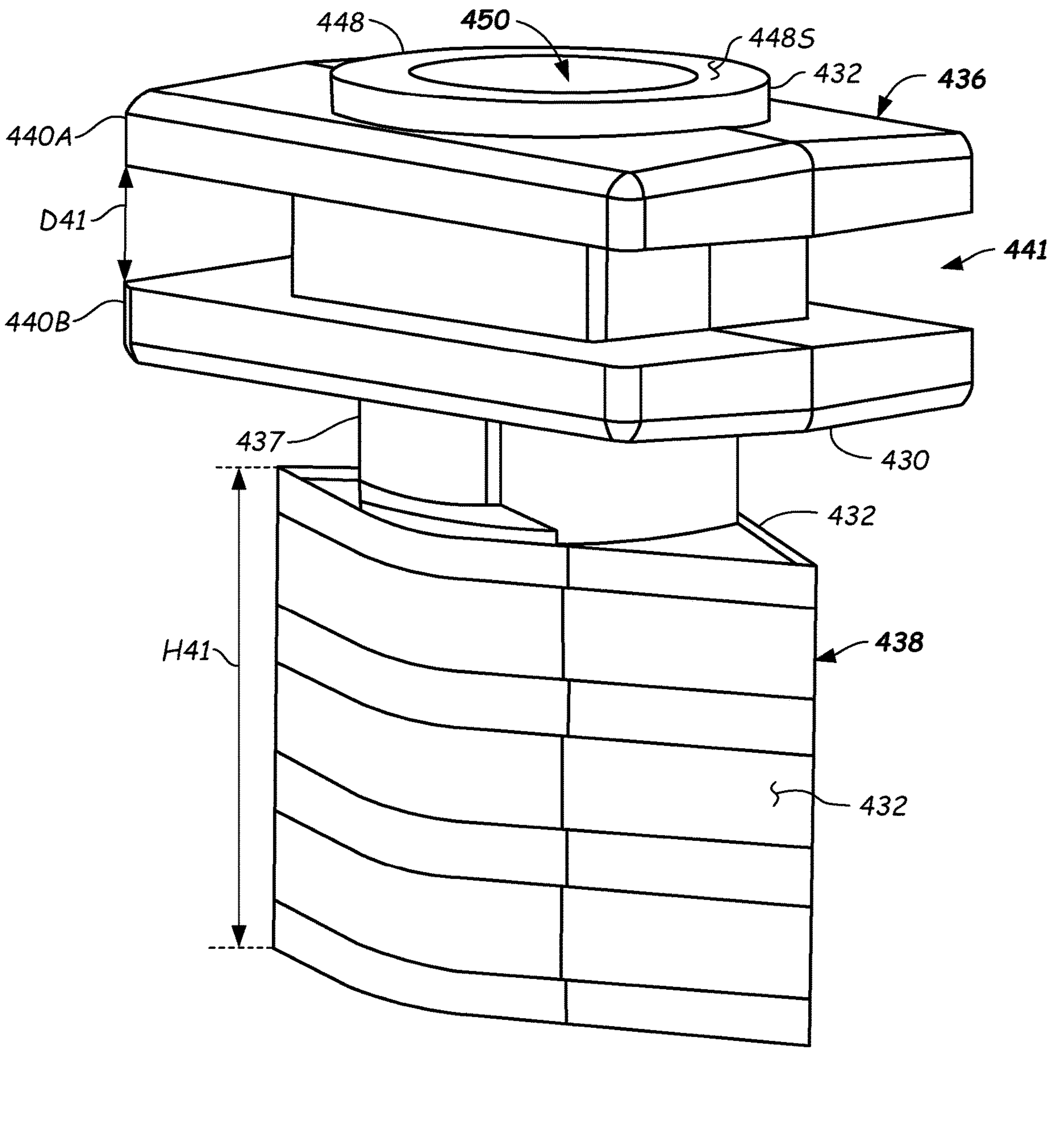

Reference is now made to FIG. 4A, which illustrates an isometric view of the fitment device 222 that is shown as being devoid of a second material. Reference is also made to FIG. 4B, which illustrates an isometric view of the fitment device 222 with the application of a second material 432. FIG. 4A illustrates a core 430 that may comprise a first material. In some embodiments, the core 430 may comprise a single first material. In some embodiments, the first material of the core 430 may include nylon or may be entirely nylon. In some embodiments, the first material of the core 430 may have a permeability of oxygen less than 9.5 ($cm^3$) (mil)/(24 hrs) (100 $in^2$) (ATM) at 25° C. In some embodiments, the first material of the core 430 may have a permeability of oxygen less than 1.2 ($cm^3$) (mil)/(24 hrs) (100 $in^2$) (ATM) at 25° C. The low permeability of the first material of the core 430 may serve to prevent or significantly limit the transfer of gases, such as oxygen, through the core 430. Accordingly, the core 430 serves to prevent or significantly limit the degradation of the calibration reagents stored in the container 220 (FIG. 3).

FIG. 4B illustrates the fitment device 222 with the addition of a second material 432. The second material 432 may be a material that seals to the first container material 324A (FIG. 3) and the second container material 324B. For example, the second material 432 may enable the first container material 324A and the second container material 324B to be heat sealed to the fitment device 222 (FIG. 2A). In some embodiments, the second material 432 may comprise a heat-sealable material, such as polypropylene or the like. In some embodiments, the second material 432 may have a gas permeability that is greater than the gas permeability of the core 430. For example, the second material 432 may have a gas permeability of oxygen greater than 1.2 ($cm^3$) (mil)/(24 hrs) (100 $in^2$) (ATM) at 25° C.

Referring to FIG. 4A, the core 430 may include a securing portion 436 and a container portion 438. An extension 437 may join the securing portion 436 and the container portion 438. The securing portion 436 may include a first flange 440A and a second flange 440B separated by a distance D41 thus forming a space 441. The first flange 440A and the second flange 440B may secure the pouch 212A to the cartridge chassis 224 (FIG. 2A). For example, the space 441 may receive one or more securing members (not shown in FIG. 4A) that are coupled to the cartridge chassis 224. The securing portion 436 may include a first end of an aperture 442 that extends through the core 430. The aperture 442 may include a second end (not shown) at the container portion 438.

The container portion 438 may include a first surface 442A and an opposite second surface 442B that join at a first end 444A and a second end 444B. The seam 322 (FIG. 3) between the first container material 324A (FIG. 3) and the second container material 324B may separate at the first end 444A and the second end 444B to contact the fitment device 222. As shown in FIG. 4A, the first surface 442A and the second surface 442B may be curved. The curved first surface 442A and the second surface 442B enable the container portion 438 to have a suitable thickness so the aperture 442 may pass through the container portion 438. The curve of the first surface 442A and the second surface 442B also enables the first container material 324A and the second container material 324B to adhere to the container portion 438 without having to bend over an edge. The container portion 438 may have a height H41 that may be about the same distance as the width W32 (FIG. 3) of the seam 322 at the upper portion interfacing with the fitment device 222.

The first surface 442A may be identical or substantially similar to the second surface 442B. The first surface 442A may include one or more features that secure the second material 432 to the first surface 442A. For example, the first surface 442A may include an opening 446 that aids in securing the second material 432 to the first surface 442A. In some embodiments, the second material 432 may adhere directly to the first surface 442A.

Referring to FIG. 4B, the second material 432 may extend into the aperture 442 to form a bore 450. The bore 450 comprises at least a portion of the aperture 442 that is coated with the second material 432. The bore 450 may have a first end at the securing portion 436 and a second end at the container portion 438. The second material 432 may form a lip 448 extending from the securing portion 436. The lip 448 may include a surface 448S that may receive a cover (558—FIG. 5A) that can be adhered to the surface 448S.

Additional reference is made to FIGS. 5A and 5B. FIG. 5A illustrates a cross-sectioned side view of the fitment device 222 wherein the bore 450 is shown as being devoid of the probe 214A (FIG. 2A). For example, the probe 214A may be in the first position spaced from the fitment device 222 and the lip 448. FIG. 5B illustrates a cross-sectioned side view of the fitment device 222 with the probe 214A in a second position received within the bore 450. As shown in FIGS. 5A and 5B, the second material 432 may be a single and/or continuous portion of material that extends into the aperture 442 to form the bore 450. In some embodiments, the second material 432 may extend at least partially within the aperture 442. In the depicted embodiment, the second material 432 may coat at least a portion of the first surface 442A of the container portion 438, the second surface 442B of the container portion 438, and/or the aperture 442.

A sealing surface 554 may be located within the bore 450 and may seal to an exterior surface 214AS of the probe 214A (FIG. 5B). The seal between the sealing surface 554 and the exterior surface 214AS of the probe 214A prevents or reduces the exchange of gases between the interior of the container 220 (FIG. 3) and the exterior of the container 220 when the probe 214A is located within the bore 450. In some embodiments, the sealing surface 554 may be formed from the second material 432. In other embodiments, the sealing surface 554 may be made of another material, such as a pliable rubber material that may seal against the exterior surface 212AS of the probe 214A. Other suitable sealing mechanisms can be used.

The aperture 442 may include surface features that retain the second material 432 within the aperture 442. For example, the aperture 442 may include an annular ring 556 that extends into the aperture 442 and prevents the second material 432 within the aperture 442 from moving axially. The core 430 may include other features that prevent the second material 432 from moving in the aperture 442.

A cover 558 may seal aperture 442 and/or the bore 450 to prevent the exchange of gases between the interior of the container 220 (FIG. 3) and the exterior of the container 220. In some embodiments, the cover 558 may be sealed to the surface 448S of the lip 448. The cover 558 may be made of a material having a low gas permeability, which prevents or reduces the exchange of gases between the interior and exterior of the container 220 (FIG. 3). The cover 558 may be made of material that can be pierced (e.g., torn) by the probe 214A as the probe 214A moves to the second position in the bore 450. In some embodiments, the cover 558 may include or be made of a metal foil or a foil that includes a metal layer having a very low gas permeability over time. The cover 558 may be made of other suitable materials.

In some embodiments, the bore 450 may include a conical portion 566. The conical portion 566 may guide the probe 214A into the bore 450 as the probe 214A transitions from the first position spaced away from the bore 450 and/or the cover 558 to the second position where the probe 214A is located within the bore 450. In some embodiments, the conical portion 566 may be formed from the second material 432. The conical portion 566 may have a wide diameter proximate the first end of the bore 450 and a narrowing diameter away from the first end of the bore 450.

The probe 214A may include a pointed end 560. The pointed end 560 may pierce the cover 558 and may contact the conical portion 566 of the bore 450 to guide the probe 214A into the bore 450. The probe 214A may include a passage 564 extending from the pointed end 560. The passage 564 may couple to the tube 215 (FIG. 2A) in the manifold 210. The passage 564 may transfer the contents of the container 220 (FIG. 3) to devices (not shown) in the gas analyzer 100 (FIG. 1A) for analysis thereof.

As shown in FIGS. 5A and 5B, the cartridge chassis 224 may have members extending from a lower surface that support the fitment device 222. In the embodiment depicted in FIGS. 5A and 5B, the cartridge chassis 224 includes a first member 560A and a second member 560B that extend from an upper part the cartridge chassis 224. The first member 560A includes a first extension 562A and the second member 560B includes a second extension 562B that may be received in the space 441. For example, the first extension 562A and the second extension 562B may be received in the space 441 so as to secure the fitment device 222 and the pouch 212A to the cartridge chassis 224.

The core 430 may be formed by an injection molding process. For example, nylon or another low gas permeable material may be injected into a mold to form the core 430. The second material 432 may be applied to the core 430 by a second molding process, such as a second injection molding process. For example, the core 430 may be placed in a second mold, wherein the second material 432, such as polypropylene, is injected into the second mold to coat the core 430 as described herein. The second material 432 may include other materials.

The core 430, the container 220, and the cover 558 may be made from low gas permeable materials, which can minimize the exchange of gas (e.g., oxygen gas) between the interior and exterior of the container 220. The second material 432 may have higher gas permeability than the core 430, but the application of the second material does not provide paths for gases to readily permeate. For example, the second material 432 applied to the first surface 442A and the second surface 442B of the container portion 438 may extend entirely or near entirely over the height H41 of the container portion 438. Thus, gases have to travel the distance H41 or nearly H41 to exchange with the container 220. In a similar manner, gases may pass through the lip 448, but the lip 448 may only provide limited area for gas permeation. Based on the foregoing, gas permeation of the pouch 212A is very low as compared to conventional fitment devices, which increases the shelf life of the pouch 212A.

In another aspect, a method of manufacturing a fitment device (e.g., fitment device 222) is illustrated by the flowchart 600 of FIG. 6. The method includes, at 602, forming a core (e.g., core 430) from a first material having a first gas permeability, the core comprising: a securing portion (e.g., securing portion 436) configured to secure to a cartridge chassis (e.g., cartridge chassis 224); a container portion (e.g., container portion 438) configured to seal to a container (e.g., container 220); and an aperture bore (e.g., aperture 422) though the core between the securing portion and the container portion.

The method further includes, at 604, coating at least a portion of the container portion and at least a portion of the aperture with a second material (e.g., second material 432) having a second gas permeability, wherein the second gas permeability is greater than the first gas permeability.

It should be readily appreciated that the present disclosure is susceptible of broad utility and application. Many embodiments and adaptations of the present disclosure other than those herein described, as well as many variations, modifications, and equivalent arrangements, will be apparent from, or reasonably suggested by, the present disclosure and the foregoing description thereof, without departing from the substance or scope of the present disclosure. Accordingly, while the present disclosure has been described herein in detail in relation to specific embodiments, it is to be understood that this disclosure is only illustrative and presents examples of the present disclosure and is made merely for purposes of providing a full and enabling disclosure. This disclosure is not intended to be limited to the particular apparatus, assemblies, systems and/or methods disclosed, but, to the contrary, the intention is to cover all modifications, equivalents, and alternatives falling within the scope of the claims.

Illustrative Embodiments

1. A method of operating a reagent cartridge having a cartridge chassis, comprising:
   providing at least one pouch configured to hold a reagent, the at least one pouch comprising:
   a container;
   a fitment device including:
      a core formed from a first material, the core including a securing portion configured to secure to the cartridge chassis;
      a container portion including at least one side portion at least partially coated with a second material, wherein the first material is different than the second material, and the container portion is sealed to the container;
      an aperture extending between the securing portion and the container; and
      a cover closing off the aperture; and
   moving a piercing probe through the cover.
2. A pouch, comprising:
   a container; and
   a fitment device further comprising:
   a core formed from a first material having a permeability of oxygen less than 9.5 ($cm^3$) (mil)/(24 hrs) (100 $in^2$) (ATM) at 25° C.,
   a securing portion configured to secure to a chassis; and
   a container portion including at least one side portion at least partially coated with a second material sealed to the container, wherein the first material is different than the second material; and
   an aperture extending between the securing portion and the container portion.

What is claimed is:

1. A fitment device comprising:
a core comprising:
a securing portion;
a container portion; and
an aperture, wherein:

the core is made of a first material having a first oxygen permeability of less than 9.5 ($cm^3$) (mil)/(24 hrs) ($100in^2$) (ATM) at 25° C.;
the securing portion is configured to secure to a chassis;
the container portion includes at least one side portion at least partially coated with a second material so as to seal the at least one side portion to a container;
the first material differs from the second material; and
the aperture extends between the securing portion and the container portion and includes a first portion coated with the second material.

2. The fitment device of claim 1, wherein the second material has a second oxygen permeability, and wherein the first oxygen permeability is less than the second oxygen permeability.

3. The fitment device of claim 1, wherein the first oxygen permeability is less than 1.2 ($cm^3$) (mil)/(24 hrs) (100 $in^2$) (ATM) at 25° C.

4. The fitment device of claim 1, wherein the first material comprises nylon.

5. The fitment device of claim 1, wherein the second material comprises polypropylene.

6. The fitment device of claim 1, wherein the container portion has an exterior portion and the aperture has a second portion wherein the exterior portion and the second portion form a continuous portion at least partially coated with the second material.

7. The fitment device of claim 1, wherein the the at least one side portion is configured to heat seal to a seam of the container.

8. The fitment device of claim 1, further comprising a cover sealing the aperture and wherein the aperture is proximate to the securing portion.

9. The fitment device of claim 8, wherein the cover is sealed to the at least one side portion.

10. The fitment device of claim 8, wherein the cover is a metal foil.

11. A fitment device comprising:
a core comprising:
a securing portion;
a container portion;
a sealing surface; and
an aperture, wherein:
the core is made of a first material having a first oxygen permeability of less than 9.5 ($cm^3$) (mil)/(24 hrs) ($100in^2$) (ATM) at 25° C.;
the securing portion is configured to secure to a chassis;
the container portion includes at least one side portion at least partially coated with a second material so as to seal the at least one side portion to a container;
the first material differs from the second material; and
the aperture extends between the securing portion and the container portion; and
the sealing surface is disposed within the aperture, and is configured to seal to an exterior of a probe configured to extend into the aperture from the securing portion.

12. The fitment device of claim 11, wherein the sealing surface is made of the second material.

13. The fitment device of claim 1, wherein the container portion includes at least a portion configured to fit within the container.

14. A reagent cartridge comprising:
at least one pouch configured to hold a reagent, the at least one pouch comprising:
a fitment device including
a core comprising:
a securing portion;
a container portion;
a sealing surface;
at least one piercing probe;
an aperture; and
a cover, wherein:
the core is made of a first material with a first oxygen permeability of less than 9.5 ($cm^3$) (mil)/(24 hrs) (100 $in^2$) (ATM) at 25° C.;
the securing portion is configured to secure to a chassis;
the container portion includes at least one side portion at least partially coated with a second material so as to seal the at least one side portion to a container;
the first material differs from the second material;
the aperture extends between the securing portion and the container portion;
the cover covers the aperture;
the at least one piercing probe is configured to puncture the cover; and either (1) the aperture includes at least a portion coated with the second material or (2) the sealing surface is disposed within the aperture and is configured to seal to an exterior of the at least one piercing probe configured to extend into the aperture from the securing portion.

15. The reagent cartridge of claim 14, further comprising a manifold including a tube coupled to the the at least one piercing probe.

16. The reagent cartridge of claim 15, wherein the manifold is moveable between a first position wherein the at least one piercing probe is spaced from the cover and a second position wherein the at least one piercing probe extends through the cover and is located within the aperture.

17. The fitment device of claim 1 further comprising a sealing surface disposed within the aperture and configured to seal to an exterior of a probe configured to extend into the aperture from the securing portion.

18. The fitment device of claim 11, wherein the first material comprises nylon or the second material comprises polypropylene.

19. The fitment device of claim 11 further comprising:
a cover sealing the aperture wherein the aperture is proximate to the securing portion and either the cover is sealed to the at least one side portion or the cover is a metal foil.

* * * * *